(12) United States Patent
Noguchi et al.

(10) Patent No.: US 12,162,078 B2
(45) Date of Patent: Dec. 10, 2024

(54) MACHINE TOOL

(71) Applicants: CITIZEN WATCH CO., LTD., Nishitokyo (JP); CITIZEN MACHINERY CO., LTD., Nagano (JP)

(72) Inventors: Kenji Noguchi, Sayama (JP); Haruhiko Misono, Nagano (JP); Toshiyuki Suzuki, Kawagoe (JP)

(73) Assignees: CITIZEN WATCH CO., LTD., Nishitokyo (JP); CITIZEN MACHINERY CO., LTD., Nagano (JP)

(*) Notice: Subject to any disclaimer, the term of this patent is extended or adjusted under 35 U.S.C. 154(b) by 838 days.

(21) Appl. No.: 17/288,643

(22) PCT Filed: Oct. 24, 2019

(86) PCT No.: PCT/JP2019/041781
§ 371 (c)(1),
(2) Date: Apr. 26, 2021

(87) PCT Pub. No.: WO2020/085454
PCT Pub. Date: Apr. 30, 2020

(65) Prior Publication Data
US 2021/0402483 A1 Dec. 30, 2021

(30) Foreign Application Priority Data

Oct. 26, 2018 (JP) ................................. 2018-202338
Dec. 25, 2018 (JP) ................................. 2018-241512

(51) Int. Cl.
B23B 13/04 (2006.01)
B23B 13/02 (2006.01)
(Continued)

(52) U.S. Cl.
CPC ............ *B23B 13/04* (2013.01); *B23B 13/024* (2013.01); *B23B 13/128* (2013.01); *B23P 23/04* (2013.01);
(Continued)

(58) Field of Classification Search
CPC ............. Y10T 29/5109; Y10T 29/5114; Y10T 29/5145; B23K 26/0093; B23P 23/00;
(Continued)

(56) References Cited

U.S. PATENT DOCUMENTS 3,541,669 A * 11/1970 Yocum ................. B23K 20/121
228/103
3,691,622 A * 9/1972 Takagi ................. B23K 20/121
228/114.5

(Continued)

FOREIGN PATENT DOCUMENTS

CN 102089102 A 6/2011
CN 108637702 A * 10/2018 ........... B23K 26/282
(Continued)

OTHER PUBLICATIONS

Nov. 23, 2023, Office Action issued by the China National Intellectual Property Administration in the corresponding Chinese Patent Application No. 201980069440.3.
(Continued)

*Primary Examiner* — Erica E Cadugan
*Assistant Examiner* — Michael Vitale
(74) *Attorney, Agent, or Firm* — KENJA IP LAW PC

(57) ABSTRACT

A machine tool comprising: a first spindle; a second spindle provided on a rear headstock to face the first spindle; a barstock supply unit for supplying an elongate rod to the first spindle; and a processing means including a tool for processing the barstock, characterized in that the machine tool further comprises: a workpiece clamp device provided on
(Continued)

the rear headstock and adapted to grip a second material comprised of the barstock that has been removed from the first spindle as an old material; and a joining means for joining opposite end portions of the second material gripped by the workpiece clamp device and of a first material gripped by the first gripping means and comprised of a barstock newly supplied by the barstock supply unit, thereby to integrate the second material and the first material into a single barstock.

2 Claims, 15 Drawing Sheets

(51) Int. Cl.
    *B23B 13/12*     (2006.01)
    *B23K 20/12*     (2006.01)
    *B23P 23/04*     (2006.01)

(52) U.S. Cl.
    CPC ........ *Y10T 29/5109* (2015.01); *Y10T 29/5145* (2015.01)

(58) Field of Classification Search
    CPC ........ B23P 23/02; B23P 23/04; B23B 13/024; B23B 13/04
    USPC ........... 29/27 C, 27 R, 564.8; 228/5.1, 114.5
    See application file for complete search history.

(56) References Cited

U.S. PATENT DOCUMENTS

| | | | | |
|---|---|---|---|---|
| 3,717,295 | A * | 2/1973 | Woodall | B23K 20/12 |
| | | | | 228/114.5 |
| 5,207,134 | A * | 5/1993 | Wakatsuki | B23Q 39/048 |
| | | | | 82/124 |
| 5,858,142 | A * | 1/1999 | Tully | B23K 20/121 |
| | | | | 228/114.5 |
| 5,964,016 | A * | 10/1999 | Ito | B23Q 1/4852 |
| | | | | 409/172 |
| 9,321,125 | B2 * | 4/2016 | Vassault | B23K 20/12 |
| 9,327,375 | B2 * | 5/2016 | Yamane | B23Q 5/048 |
| 2007/0101838 | A1 * | 5/2007 | Semmlinger | B23K 20/12 |
| | | | | 82/142 |
| 2021/0129262 | A1 * | 5/2021 | Nakaya | B23K 20/123 |
| 2021/0291294 | A1 * | 9/2021 | Nakaya | B23K 20/121 |

FOREIGN PATENT DOCUMENTS

| | | | | |
|---|---|---|---|---|
| CN | 110202387 | A * | 9/2019 | |
| DE | 102016122746 | A1 | 5/2018 | |
| JP | S4928339 | B1 | 7/1974 | |
| JP | S5255929 | U | 4/1977 | |
| JP | H079201 | A | 1/1995 | |
| JP | 2004050303 | A | 2/2004 | |
| JP | 2008246648 | A | 10/2008 | |
| JP | 2015174179 | A | 10/2015 | |
| JP | 2017209776 | A | 11/2017 | |
| WO | WO-2005089997 | A1 * | 9/2005 | ............. B23K 20/12 |
| WO | WO-2020216903 | A1 * | 10/2020 | ............. B23K 11/02 |

OTHER PUBLICATIONS

Feb. 28, 2023, Notification of Reasons for Refusal issued by the Japan Patent Office in the corresponding Japanese Patent Application No. 2020-552604.

Mar. 21, 2023, Office Action issued by the Korean Intellectual Property Office in the corresponding Korean Patent Application No. 10-2021-7011959.

Jul. 25, 2023, Office Action issued by the China National Intellectual Property Administration in the corresponding Chinese Patent Application No. 201980069440.3.

Dec. 24, 2019, International Search Report issued in the International Patent Application No. PCT/JP2019/041781.

Apr. 27, 2021, International Preliminary Report on Patentability issued in the International Patent Application No. PCT/JP2019/041780.

Apr. 27, 2021, International Preliminary Report on Patentability issued in the International Patent Application No. PCT/JP2019/041781.

Apr. 27, 2021, International Preliminary Report on Patentability issued in the International Patent Application No. PCT/JP2019/041782.

Dec. 26, 2022, Office Action issued by the Taiwan Intellectual Property Office in the corresponding Taiwanese Patent Application No. 108138699.

* cited by examiner

MACHINE TOOL

TECHNICAL FIELD

The present disclosure relates to a machine tool.

BACKGROUND

Conventionally, there is known a machine tool wherein an elongate barstock supplied from a barstock supply unit to a first spindle is gripped by a gripping means of the first spindle, and the barstock is sequentially subjected to a predetermined processing and parting by means of a tool, thereby continuously processing a number of products from the barstock.

There is also known a machine tool including a first spindle and a second spindle opposite to the first spindle, wherein the machine tool is configured such that, when the barstock reaches a length that makes it difficult to process the products, the barstock is removed from the first spindle and transferred to the second spindle as an old material, and a new barstock is supplied from the barstock supply unit to the first spindle as a new material, the opposite end portions of the old material gripped by a gripping means of the second spindle and the new material gripped by a gripping means of the first spindle are then joined together, for example, by means of a form-locking fitting or frictional pressure welding so that a single barstock is formed from the old material and the new material, which is then sequentially subjected a predetermined processing and parting by means of a tool, so as to fully use the old material without waste (refer, for example, to PTL 1).

CITATION LIST

Patent Literature

PTL 1: JP 2015-174179 A1

SUMMARY

Technical Problem

However, in the conventional machine tool described above, since the joining of the old material and the new material to each other is carried out by using both the first spindle and the second spindle, after the old material has been transferred from the first spindle to the second spindle, there arises a problem that it is not possible to carry out a predetermined processing on the barstock by means of a tool while the old material is being gripped by the gripping means of the second spindle.

The present disclosure has been conceived in view of the abovementioned problem, and it is an object of the present disclosure to provide a machine tool adapted to carry out a predetermined processing on a barstock by means of a tool, even while the old material is being gripped by the second spindle.

Solution to Problem

According to one aspect of the present disclosure, there is provided a machine tool comprising: a first spindle including a first gripping means; a second spindle including a second gripping means and provided on a rear headstock to face the first spindle; a barstock supply unit for supplying an elongate rod to the first spindle; a processing means including a tool for processing the barstock; and a product processing means for controlling an operation of the first spindle, the second spindle, the barstock supply unit and the processing means such that the barstock gripped by the first gripping means is continuously subjected to a predetermined processing and a parting process by means of the processing means, and the barstock cut off by the parting process is gripped by the second gripping means and subjected to the predetermined processing by means of the processing means, thereby to provide a plurality of products. The machine tool according to the present disclosure is characterized in that it further comprises: a workpiece clamp device provided on the rear headstock and adapted to grip the barstock as an old material that has been removed from the first spindle; a new material supply means for controlling the operation of the first spindle and the barstock supply unit such that a new material is supplied from the barstock supply unit to the first spindle, from which the old material has been removed; and a joining means for joining opposite end portions of the old material gripped by the workpiece clamp device and of the new material gripped by the first gripping means, thereby to integrate the old material and the new material into a single barstock.

Preferably, in the machine tool of the present disclosure with the configuration as described above, the predetermined processing by means of the product processing means with respect to the barstock gripped by the second gripping means, and the joining of the old material and the new material by means of the joining means are carried out simultaneously.

Preferably, in the machine tool of the present disclosure with the configuration as described above, the workpiece clamp device has a clamp-side gripping means for gripping the barstock, and the clamp-side gripping means and the first gripping means are of the same inner diameter.

Advantageous Effect

According to the present disclosure, it is possible to provide a machine tool adapted to carry out predetermined processing on a barstock by means of a tool, even while the old material is being gripped by the second spindle.

DETAILED DESCRIPTION

The machine tool 1 according to one embodiment of the present disclosure will be described below in further detail with reference to the drawings.

Figure 1:
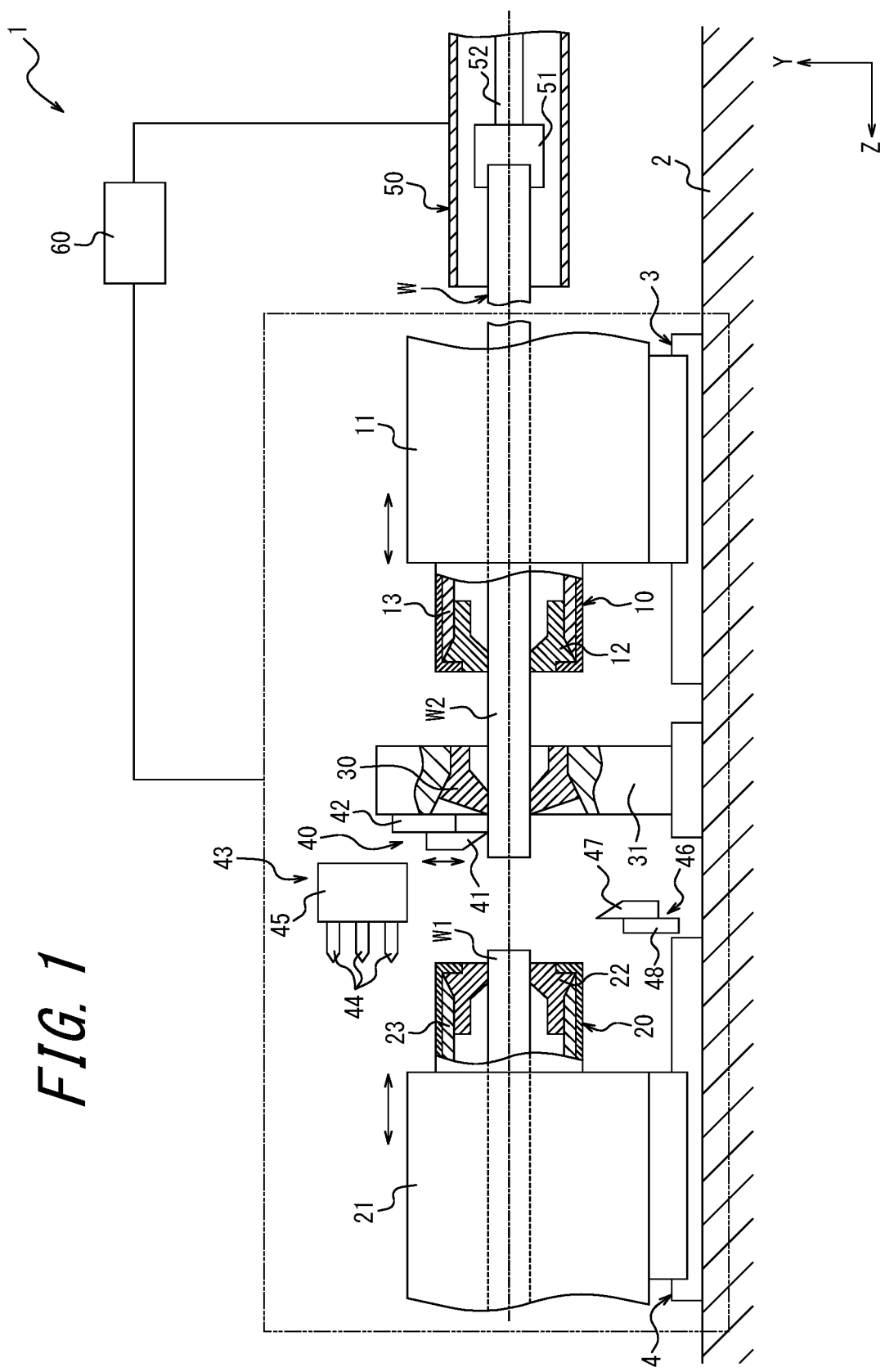
FIG. 1 is a schematic view illustrating the structure of a machine tool according to one embodiment of the present disclosure.

The machine tool 1 illustrated in FIG. 1 is an automatic lathe (CNC lathe) for processing workpiece in the form of an elongate rod W and is provided with a front spindle 10 as a first spindle and a rear spindle 20 as a second spindle.

The front spindle 10 and the rear spindle 20 are arranged opposite to each other so that the axis of the front spindle 10 and the axis of the rear spindle 20 are parallel to each other. Hereinafter, the direction parallel to the axes of the front spindle 10 and the rear spindle 20 is defined as the Z-axis direction, the direction perpendicular to the Z-axis direction is defined as the X-axis direction, and the direction perpendicular to the Z-axis direction and the X-axis direction are defined as the Y-axis direction.

A front headstock 11 is provided on the base 2 so as to be movable in the Z-axis direction by means of a front moving mechanism 3, such as a guide rail mechanism. The front spindle 10 is rotatably supported with the front headstock 11 gripping the barstock W and driven for rotation by means of a spindle motor. As the spindle motor, for example, there may be used a built-in motor arranged between the front headstock 11 and the front spindle 10 inside the front headstock 11 can be adopted.

On the base 2, for example, a back headstock 21 is also provided so as to be movable in the Z-axis direction by a rear moving mechanism 4, such as a guide rail mechanism. The rear spindle 20 is rotatably supported on the rear spindle 21 by gripping the barstock W, and rotationally driven by a spindle motor. As the spindle motor, for example, there may be used a built-in motor configured between the rear headstock 21 and the rear spindle 20 inside the rear headstock 21.

An X-axis moving mechanism for moving the front spindle 10 relative to the rear spindle 20 in the X-axis direction is provided between the base 2 and the front headstock 11 or between the base 2 and the rear headstock 21. Furthermore, between the base 2 and the front headstock 11 or between the base 2 and the rear headstock 21, a Y-axis moving mechanism is provided for moving the front spindle 10 relative to the rear spindle 20 in the Y-axis direction.

A front chuck 12 as a first gripping means is provided at the tip of the front spindle 10 and adapted to be opened and closed. The front chuck 12 is accommodated inside the chuck sleeve 13. When the chuck sleeve 13 is slidingly moved toward the tip end of the front spindle 10, the tapered surface of the chuck sleeve 13 presses the tapered surface of the front chuck 12 to close the front chuck 12. On the contrary, when the chuck sleeve 13 is slidingly moved toward the base end of the front spindle 10, the pressure on the tapered surface of the front chuck 12 by the tapered surface of the chuck sleeve 13 is released to open the front chuck 12. The front spindle 10 is adapted to grip the barstock W by inserting the barstock W while the front chuck 12 is in an opened state, and then closing the front chuck 12.

A rear chuck 22 as a second gripping means is provided at the tip of the rear spindle 20 and adapted to be opened and closed. The rear chuck 22 is accommodated inside the chuck sleeve 23. When the chuck sleeve 23 is slidingly moved toward the tip end of the rear spindle 20, the tapered surface of the chuck sleeve 23 presses the tapered surface of the rear chuck 22 to close the rear chuck 22. On the contrary, when the chuck sleeve 23 is slidingly moved toward the base end of the rear spindle 20, the pressure of the tapered surface of the chuck sleeve 23 on the tapered surface of the rear chuck 22 is released, to open the rear chuck 22. The rear spindle 20 is adapted to grip the barstock W by inserting the barstock W in an open state of rear chuck 22, and then closing the back chuck 22.

The configuration of the slide drive mechanism of the chuck sleeves 13 and 23 described above is not limiting the present disclosure, and various configurations may be adopted.

A guide bush 30 is provided between the front spindle 10 and the rear spindle 20. The guide bush 30 is mounted on a guide bush support base 31 installed on the base 2 and arranged coaxially with the front spindle 10. The guide bush 30 is adapted to be adjusted to an inner diameter corresponding to the outer diameter of the barstock W, by adjusting the position of the guide bush 30 in the axial direction with respect to the guide bush support base 31. The guide bush 30 is adapted to movably guide the barstock W in the Z-axis direction.

The machine tool 1 includes a processing unit 40 as the processing means. The processing unit 40 includes a tool 41 for processing the barstock W. The tool 41 is held by the tool post 42. In the tool post 42, the tool 41 is arranged in front of the guide bush 30 and supported by the guide bush support 31 so as to be movable in the X-axis direction and the Y-axis direction. The position of the tool post 42 in the Z-axis direction is constant. The tool post 42 is provided, for example, with a tool 41 in the form of an outer diameter cutting tool, a parting tool, and the like, which can be appropriately switched according to the contents of the processing, by moving the tool post 42, for example, in the X-axis direction.

The machine tool 1 is provided with a processing means that includes a rear fixed processing unit 43. The rear fixed processing unit 43 includes a plurality (three) of rear processing tools 44 for processing the barstock W. Each tool 44 is fixed to the base 2 via a rear tool post 45 and adapted to be appropriately switched according to the contents of the processing, by moving the rear spindle 20 (rear headstock 21) in the Y-axis direction.

The processing means of the machine tool 1 further includes a rear movable processing unit 46. The rear movable processing unit 46 includes a tool 47 for processing the barstock W. The tool 47 is held by a tool post 48. The tool post 48 is movably supported by the base 2 in the X-axis direction and the Y-axis direction. The position of the tool post 48 in the Z-axis direction is constant. The tool post 48 is provided with tools 47, such as an outer diameter cutting tool, a parting tool, and the like, which may be appropriately switched according to the contents of the processing, by moving the tool table 48 in the X-axis direction, for example.

The machine tool 1 includes a barstock supply unit (barstock feeder) 50 arranged behind the front spindle 10. The barstock supply unit 50 includes a finger 51 for gripping the rear end of the barstock W, and a drive rod 52 for driving the finger 51 in the Z-axis direction. The barstock supply unit 50 is adapted to sequentially supply the barstock W to the front spindle 10. Furthermore, the barstock supply unit 50 is adapted to pull the barstock W, which protrudes from the front spindle 10 toward the rear spindle 20, toward the front spindle 10.

The machine tool 1 includes a control unit 60. The control unit 60 may be comprised, for example, of a microcomputer provided with a CPU (Central Processing Unit) and a storage means, such as a memory. The control unit 60 is adapted to integrally control the operation of the front spindle 10 (including the front headstock 11 and the front chuck 12), the rear spindle 20 (including the rear headstock 21 and the rear chuck 22), the processing unit 40, the rear fixed processing unit 43, the rear movable processing unit 46 and the barstock supply unit 50.

More specifically, the control unit 60 has a function as a product processing means for operating the front spindle 10, the rear spindle 20, the barstock supply unit 50, the processing unit 40, the rear fixed processing unit 43 and the rear movable processing unit 46, so as to sequentially carry out the predetermined processing and parting of the barstock W gripped by the front chuck 12 or the back chuck 22, by means of the processing unit 40, the rear fixed processing unit 43 and the rear movable processing unit 46, thereby to provide a plurality of products.

The control unit 60 also has a function as an old material transfer means for operating the front spindle 10 and rear spindle 20, so as to remove the barstock W after the processing of the barstock W by the function as the product processing means, from the front spindle 10 as an old material W1 and transfer it over to the rear spindle 20.

The control unit 60 also has a function as a new material supply means for operating the front spindle 10 and the barstock supply unit 50, so as to supply a new barstock W from the barstock supply unit 50 as a new material W2 to the front spindle 10, from which the old material W1 has been removed, and grip the new material W2 by means of the front chuck 12.

The control unit 60 also has a function as a joining means for joining the opposite end portions of the old material W1 gripped on the rear spindle 20 by the back chuck 22 and the new material W2 gripped on the front spindle 10 by the front chuck 12, thereby to form a single barstock W3 from the old material W1 and the new material W2.

The control unit 60 also has a function as a pulling means for operating the front spindle 10, the rear spindle 20 and the barstock supply unit 50 so as to remove from the rear spindle 20 the portion of the old material W1 in the barstock W, which has been formed by joining the old material W1 and the new material W2 by the function as the joining means, and to pull it toward the front spindle 10.

The control unit 60 also has a function for controlling the operation of the front spindle 10, the rear spindle 20, the barstock supply unit 50, the processing unit 40, the rear fixed processing unit 43 and the rear movable processing unit 46, so as to continuously carry out predetermined processing and parting of the barstock W3, which has been pulled toward the front spindle 10 by the above-mentioned function as the pulling means, and gripped by the front chuck 12 by the above-mentioned function as the product processing means.

The control unit 60 also has a function for controlling the operation of the front spindle 10, the rear spindle 20 and the barstock supply unit 50, so that the front chuck 12 grips the portion of the old material W1 in the barstock W3, which has been formed by joining the old material W1 and the new material W2, upon an initial processing of the barstock W3 by means of the function as the product processing means, after the barstock W3 has been pulled toward the front spindle 10 and gripped by the front chuck 12 by of the abovementioned function as the pulling means.

The control unit 60 also has a functions as a gripped portion moving means for moving the front spindle 10 (front chuck 12) so that the front chuck 12 grips the portion of the barstock W3, which has been formed by joining the old material W1 and the new material W2, except the joint portion 80 between the old material W1 and the new material W2, when sequentially carrying out the predetermined processing and parting of the barstock W3 by the abovementioned function as the product processing means.

The control unit 60 also has a function for controlling the operation of the front spindle 10, the rear spindle 20, the barstock supply unit 50 and the processing unit 40, when sequentially carrying out the predetermined processing and parting of the barstock W3, which has been formed by joining the old material W1 and the new material W2, by the abovementioned function as the product processing means, so as to carry out parting of the barstock W3 as the joint portion 80 between the old material W1 and the new material W2 is positioned at the guide bush 30, on a side of the new material W2 than the joint portion 80.

Figure 7A:
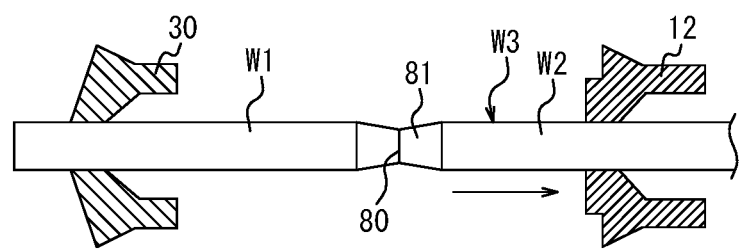
FIG. 7A is a schematic view illustrating a state in which a barstock formed by friction-welding of the old material and the new material is pulled toward the front spindle.
Figure 7B:
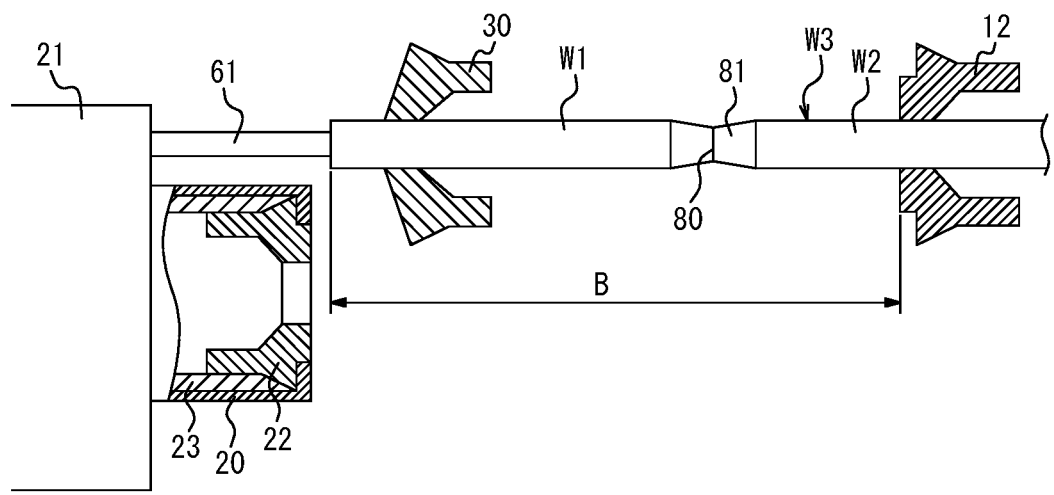
FIG. 7B is a schematic view illustrating a state of measuring the protrusion length, from the front chuck, of the barstock formed by friction-welding of the old material and the new material.
Figure 11A:
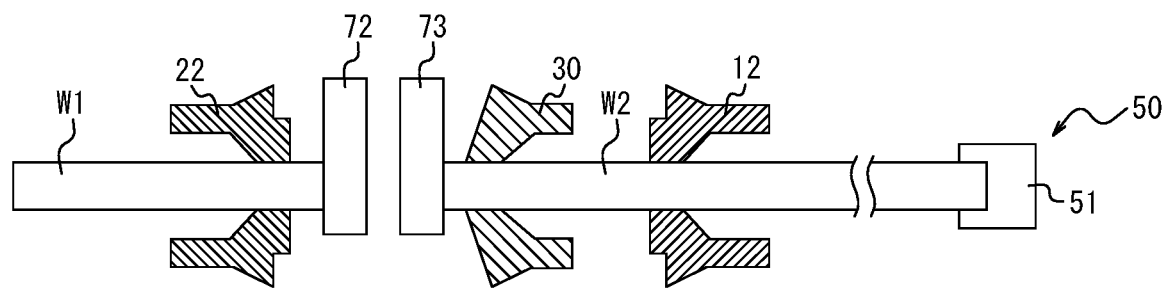
FIGS. 11A to 11C are schematic views illustrating another method of measuring the axial position of the joint portion.
Figure 11B:
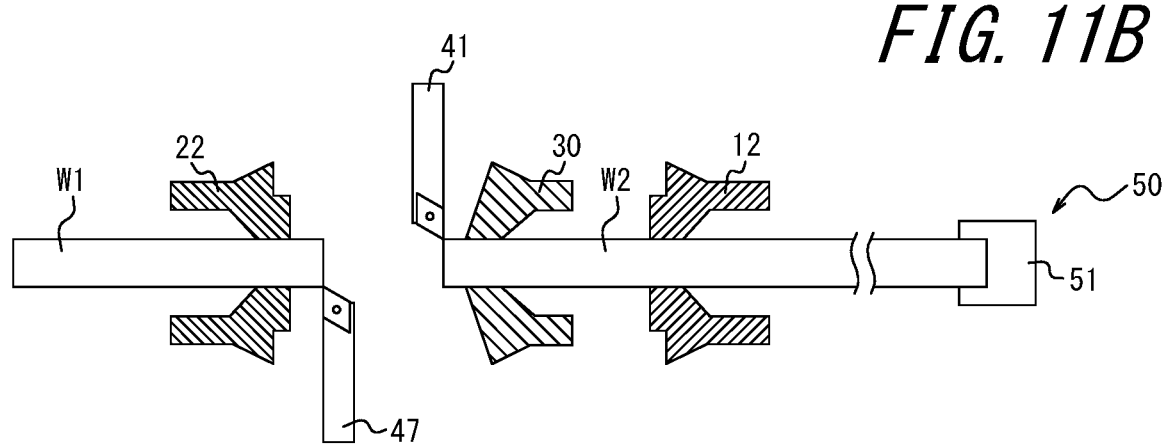
Figure 11C:
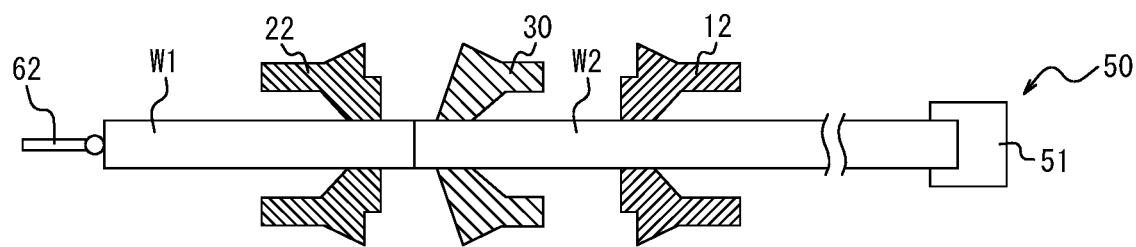

For recognizing the axial position of the joint portion 80 between the old material W1 and the new material W2 of the barstock W3 when carrying out the abovementioned control, the front chuck 12 of the machine tool 1 may be configured to include a measuring rod 61 as a position recognition means illustrated in FIG. 7B, or an old material position measuring terminal 62 as a position recognition means illustrated in FIG. 11C.

In the following, explanation will be made of the procedure for continuously processing a number of products P from an elongate barstock W, by means of a machine tool 1 having the abovementioned configuration. The procedure is carried out, as described above, by integrally controlling each part of the machine tool 1 by the control unit 60.

In FIGS. 2 to 11, the front spindle 10 and the rear spindle 20 are omitted, and only the front chuck 12 and the rear chuck 22 are illustrated. It is assumed, however, that the front chuck 12 is moved together with the movement of the front spindle 10 and the rear chuck 22 is moved together with the movement of the rear spindle 20.

Figure 2A:
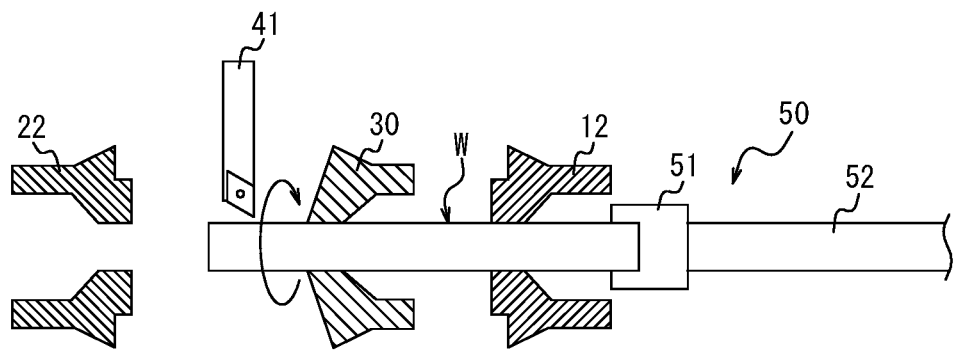
FIG. 2A is a schematic view illustrating a state in which a predetermined processing is carried out on the barstock.

As illustrated in FIG. 2A, when the barstock W is supplied from the base end side of the front spindle 10 to the front spindle 10 by the barstock supply unit 50, the barstock W is gripped by the front chuck 12. The barstock W gripped by the front spindle 10 (front chuck 12) is in a state in which it protrudes from the guide bush 30 toward the rear spindle 20 with a predetermined length. In this state, by rotationally driving the front spindle 10 by the spindle motor, the barstock W is rotated. With respect to the rotating barstock W, by moving a selected tool 41 of the processing unit 40 in the Y-axis direction (cutting direction) to cut into the barstock W, and moving the front spindle 10 (front headstock 11) in the Z axis direction (feeding direction), a predetermined processing (cutting) can be performed on the barstock W.

After the predetermined processing of the barstock W gripped by the front spindle 10, the rear spindle 20 is arranged coaxially with the front spindle 10 and the end portion of the barstock W gripped by the front spindle 10 is placed on the rear spindle 20. In this state, the barstock W is cut off by the tool 41 so that the cut-off barstock W can be transferred from the front spindle 10 to the rear spindle 20.

Figure 2B:
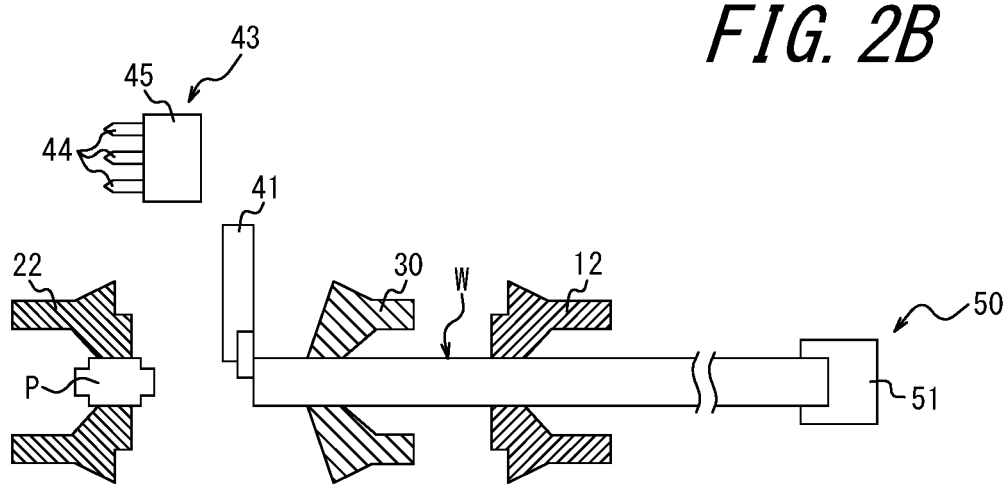
FIG. 2B is a schematic view illustrating a state in which a product is processed from the barstock.

As illustrated in FIG. 2B, the barstock W transferred from the front spindle 10 and held by the rear chuck 22 on the rear spindle 20 may be further processed. In this case, by moving the rear spindle 20 in the Y-axis direction or the Z-axis direction, the barstock W can be processed (cut) by the selected tool 44 of the rear fixed processing unit 43. Further, the barstock W may be processed by the tool 47 of the rear movable processing unit 46. By this processing, the barstock W is completed as a product P. The completed product P is taken out from the rear spindle 20 and transferred to a next process step.

During the processing of the barstock W by means of the rear spindle 20, the barstock W is fed out by the barstock supply unit 50 on the side of the front spindle 10, and the predetermined processing and parting of the barstock W on the front spindle 10 are performed again, as described above. Similarly, by feeding out the barstock W and repeating the predetermined processing and parting, a plurality of products P having a predetermined shape can be obtained from a single elongate barstock W.

Figure 3A:
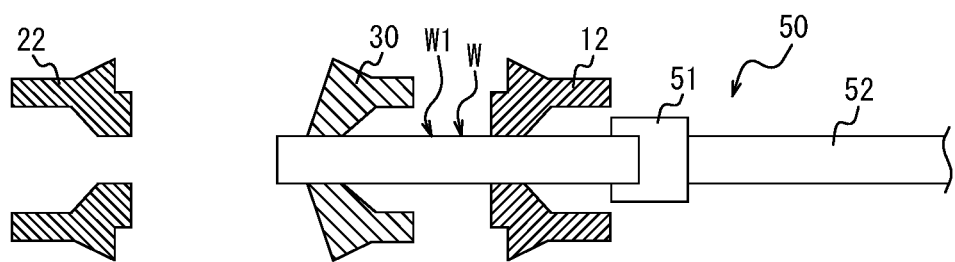
FIG. 3A is a schematic view illustrating a state in which the processing of the barstock has been completed.
Figure 3B:
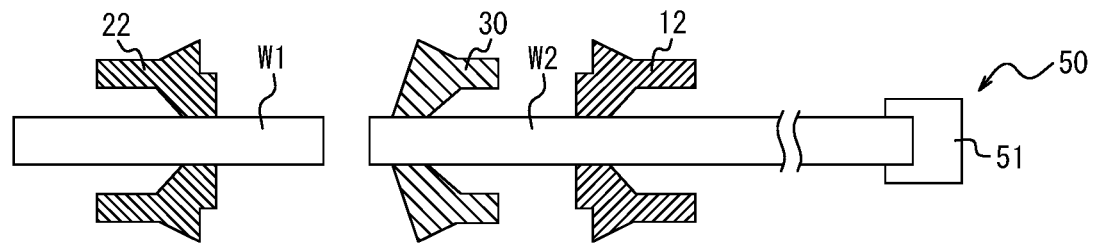
FIG. 3B is a schematic view illustrating a state in which the old material has been transferred from the front spindle to the rear spindle and the new material has been supplied to the front spindle.

As illustrated in FIG. 3A, during processing of a plurality of products P are processed from the barstock W, when the barstock W reaches a length with which it cannot be processed while being gripped by the front chuck 12 of the front spindle 10, the processing of the barstock W is completed and the barstock W constitutes an old material W1 as a residual material.

When the processing of the barstock W has been completed and an old material W1 is generated, the rear spindle 20 is moved toward the front spindle 10. The gripping of the old material W1 by the front chuck 12 is released and the rear chuck 22 now grips the old material W1. Then, by gripping the old material W1 by means of the rear chuck 22, the old material W1 is transferred from the front spindle 10 to the rear spindle 20. The rear spindle 20 having received the old material W1 is moved in the Z-axis direction so as to be separated from the front spindle 10 while holding the old material W1. Then, the new barstock W constituting the new material W2 is supplied from the barstock supply unit 50 to the front spindle 10. The new material W2 being gripped by the front chuck 12 is now in the state illustrated in FIG. 3B.

Subsequently, the old material W1 and the new material W2 are joined. On that time, a procedure for recognizing the axial position of the joint portion 80 in the joined barstock W3 is also performed.

Figure 4A:
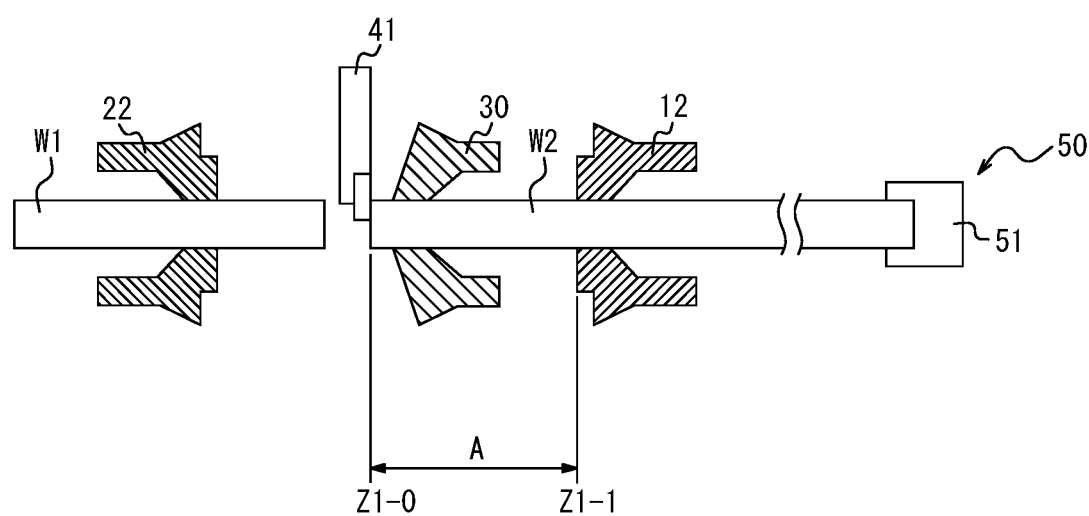
FIG. 4A is a schematic view illustrating a state in which the protrusion length of the new material from the front chuck is measured.
Figure 4B:
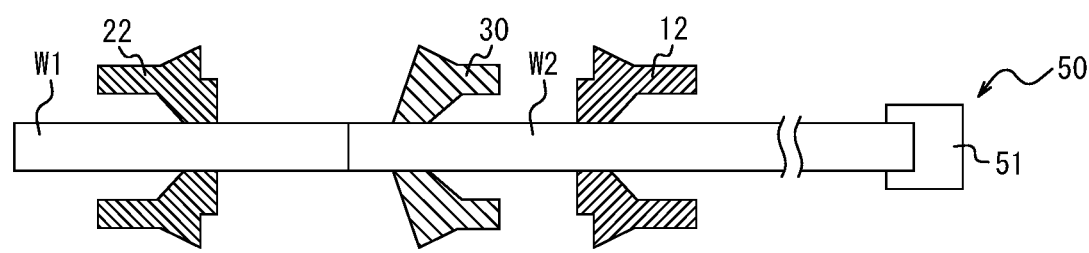
FIG. 4B is a schematic view illustrating a state in which the front spindle and the rear spindle are moved toward each other from the position illustrated in FIG. 4A to bring the opposite end portions of the old material and the new material into contact with each other.

First, as illustrated in FIG. 4A, the tip end of the new material W2 facing the side of the rear spindle 20 is subjected to an end processing by the tool 41. Here, the tool 41 supported by the guide bush support base 31 has a position (Z1-0) in the Z-axis direction that is determined, and the Z-axis position (Z1-1) of the front chuck 12 has been recognized by the control unit 60 that controls the position of the front chuck 12, Therefore, the control unit 60 is capable of calculating the protrusion length of the new material W2 from the front chuck 12.

Subsequently, the front spindle 10 and the rear spindle 20 are moved in the Z-axis direction toward each other to bring the opposite end faces of the old material W1 and the new material W2 into contact with each other. At this time, the rear spindle 20 is set in a torque skipping state (for detecting the torque change of the motor for the rear movable mechanism 4 when the end faces come into contact with each other and thereby stopping the movement of the rear spindle). By this, when the end faces of the old material W1 and the new material W2 and the new material W2 are brought into contact with each other, it is possible to prevent misalignment of the old material W1 or the new material W2 with respect to the rear spindle 20 or the front spindle 10, or movement of the front spindle 10 in the Z-axis direction.

Figure 5A:
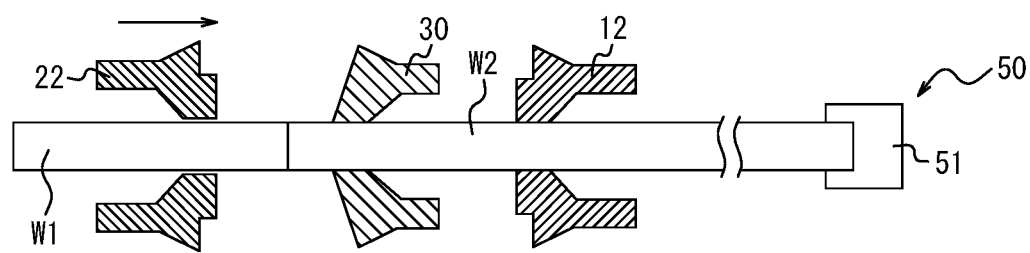
FIG. 5A is a schematic view illustrating a state in which the rear spindle is moved from the state illustrated in FIG. 4B toward the front spindle with the rear chuck opened.
Figure 5B:
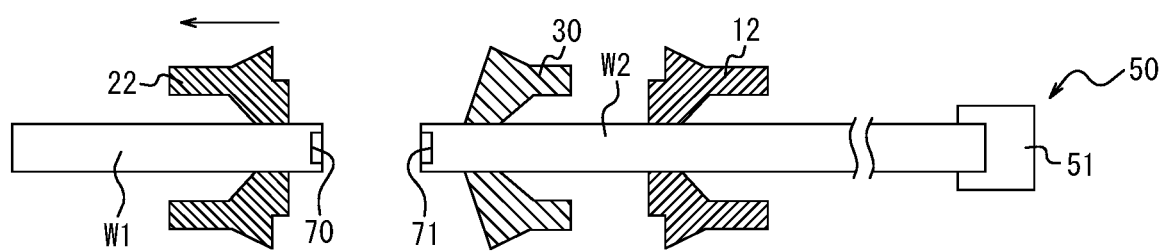
FIG. 5B is a schematic view illustrating a state in which the rear spindle is moved from the state illustrated in FIG. 4A away from the front spindle, with the old material gripped by the rear chuck, to form recesses in the end surface of the old material and the end surface of the new material.

Then, as illustrated in FIG. 5A, the rear chuck 22 is opened with the end faces in contact with each other, the rear spindle 20 is moved toward the front spindle 10, and the tip side portion of the old material W1 closer to the new material W2 is gripped by the rear chuck 22. Then, with the old material W1 gripped by the rear chuck 22, the rear spindle 20 is moved in the Z-axis direction away from the front spindle 10, and the end faces of the old material W1 and the end faces of the new material W2, which are separated from each other, are formed with recesses 70 and 71, respectively, by using a tool 41, a tool 44, or the like.

Subsequently, the opposite end portions of the old material W1 gripped by the rear chuck 22 and the new material W2 gripped by the front chuck 12 (the end faces formed with the recesses 70 and 71) are friction-welded. The friction-welding can be carried out, for example, by the following procedure.

Figure 6A:
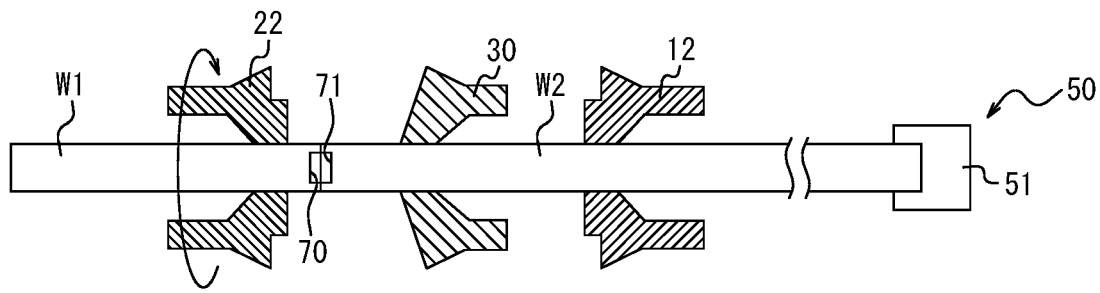
FIG. 6A is a schematic view illustrating a state in which the old material and the new material are subjected to friction-welding.

First, the rear spindle 20 is moved in the Z-axis direction toward the front spindle 10 in the torque skipping state to bring the end faces of the old material W1 and the end faces of the new material W2 into contact with each other, as illustrated in FIG. 6A. From the position where the end face of the old material W1 and the end face of the new material W2 are in contact with each other, the rear spindle 20 is then further moved toward the front spindle 10 in the Z-axis direction by a predetermined distance (for example, 0.3 mm), such that the end face of the old material W1 and the end face of the new material W2 are in contact with each other under a predetermined pressure. Then, in this state, for example, by rotating only the rear spindle 20 at a predetermined speed while stopping the front spindle 10 without rotating it, frictional heat is generated between the end face of the old material W1 and the end face of the new material W2 to heat these end faces.

In the present embodiment, only the rear spindle 20 is rotated at a predetermined speed while stopping the front spindle 10 without rotation, to cause a relative rotation between the front spindle 10 and the rear spindle 20 and thereby generate frictional heat between the end face of the new material W2 and the end face of the old material W1. However, the frictional heat may be generated between the end face of the front spindle 10 and the end face of the new material W2, by rotating only the front spindle 10 at a predetermined speed while stopping the rear spindle 20 without rotation. Alternatively, the frictional heat may be generated between the end face of the front spindle 10 and the end face of the new material W2 by rotating the front spindle 10 and the rear spindle 20 in opposite directions. Further alternatively, the frictional heat may be generated between the end face of the front spindle 10 and the end face of the new material W2 by rotating the front spindle 10 and the rear spindle 20 in the same direction at different speeds.

When the end face of the old material W1 and the end face of the new material W2 reach a predetermined temperature due to the frictional heat generated between the end face of the old material W1 and the end face of the new material W2, the relative rotation between the front spindle 10 and the rear spindle 20 is stopped and the front spindle 10 and the rear spindle 20 are relatively moved toward each other so that the end of the old material W1 and the end of the new material W2 are pressed against each other in the Z-axis direction under a predetermined pressure (upset pressure). As a result, as illustrated in FIG. 6B, the old material W1 and the new material W2 are joined with their axial end faces as the joint portion 80, to form a single barstock W3.

Figure 6B:
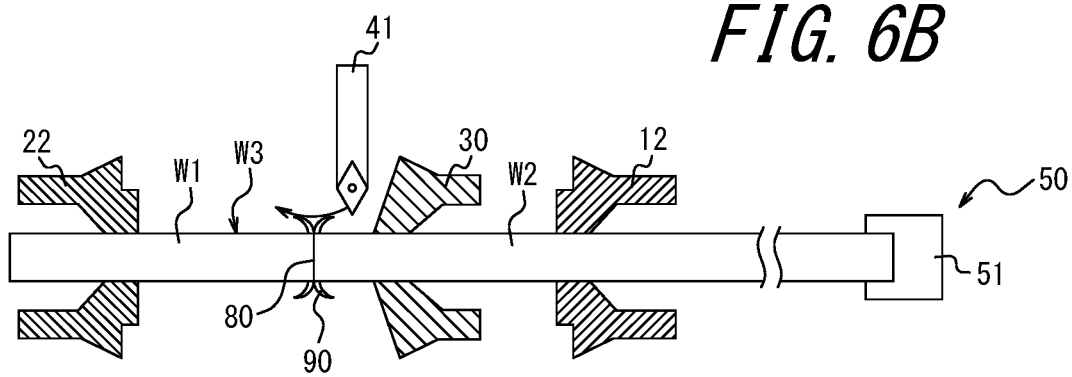
FIG. 6B is a schematic view illustrating a state in which the joint portion of the friction-welded old material and new material is subjected to deburring process.

As illustrated in FIG. 6B, burrs 90 are formed at the joint portion 80 of the barstock W3 that has been friction-welded, by a portion of the old material W1 and the new material W2 that have been softened under frictional heat and extruded radially outward. After completion of the friction-welding between the old material W1 and the new material W2, the machine tool 1 carries out a cutting process for removing the burrs 90 from the barstock W3 by using the tool 41. The cutting process may be carried out easily, by urging the tool 41 against the burrs 90 while holding the barstock W3 at least by means of one of the front spindle 10 and the rear spindle 20 while rotating the front spindle 10 or the rear spindle 20 holding the barstock.

Figure 6C:
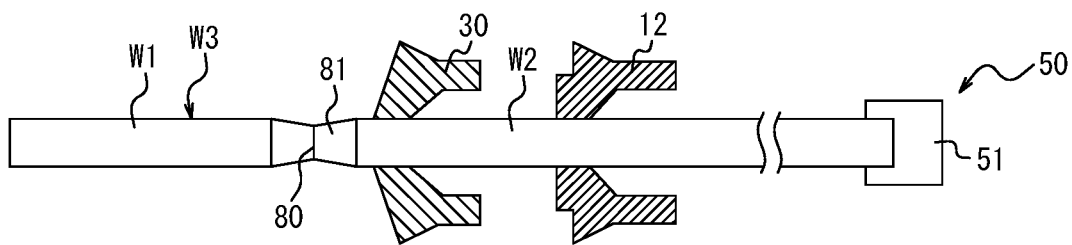
FIG. 6C is a schematic view illustrating a state of the barstock after the deburring process.

By carrying out the cutting process for removing the burrs 90, as illustrated in FIG. 6(c), reduced diameter portion 81 are formed on both sides of the joint portion 80 of the outer peripheral surface of the barstock W3, having a diameter smaller than that of the outer peripheral surface of the barstock W3.

In the present embodiment, the friction-welding can be easily carried out by forming the recesses 70 and 71 on the end face of the old material W1 and the end face of the new material W2. However, the friction-welding may be carried out without forming the recesses 70 and 71.

When the old material W1 and the new material W2 are joined to form the barstock W3, as illustrated in FIG. 7A, the gripping of the portion of the new material W2 in the barstock W3 by the rear chuck 22 is released, and the front chuck 12 gripping the portion of the new material W2 in the barstock W3 is moved together with the front spindle 10 in the Z-axis direction, away from the rear spindle 20. As a result, the barstock W3 is pulled toward the front spindle 10 and removed from the rear spindle 20.

Then, as illustrated in FIG. 7B, the rear spindle 20 is moved in the Z-axis direction and the Y-axis direction and the tip end of the measuring rod 61 fixed to the rear headstock 21 of the rear spindle 20 is urged against the rear end surface of the old material W1 facing the side opposite to the front spindle 10, in a torque skipping state.

Here, since the measuring rod 61 is fixed to the rear headstock 21 of the rear spindle 20, the control unit 60 for controlling the position of the rear spindle 20 can recognize the position of the tip end of the measuring rod 61 in the Z-axis direction. Furthermore, as described above, the control unit 60 can also recognize the position of the front chuck 12 in the Z-axis direction. Therefore, by bringing the tip of the measuring rod 61 into contact with the rear end surface of the old material W1, it is possible for the control unit 60 to calculate the protrusion length B of the barstock W3 from the front chuck 12.

The end portions of the old material W1 and the new material W2 constituting the barstock W3 are crushed at the joint portion at the time of friction-welding, and the crushing length α can be calculated from the relative movement amount in the Z-axis direction between the front spindle 10 and the rear spindle 20 or the like, at the time of friction-welding.

Therefore, the control unit 60 can calculate the length L of the portion of the old material W1 in the barstock W3, as L=BA+α/2. Since the length L corresponds to the distance from the tip of the barstock W3 to the joint 80, the control unit 60 can recognize the position of the joint 80 on the barstock W3 in the Z-axis direction. Furthermore, even if the parting process of the barstock W3 is repeatedly carried out, since the control unit 60 can recognize the position where the parting process is carried out, it is possible always to recognize the axial position of the joint 80 in the barstock W3 after the parting process.

Figure 8A:
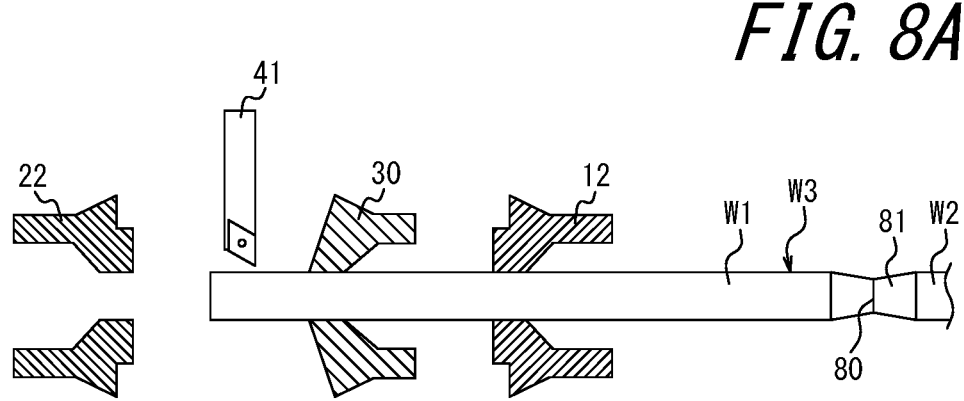
FIG. 8A is a schematic view illustrating a state in which a barstock formed by joining an old material and a new material is subjected to a predetermined processing.
Figure 8B:
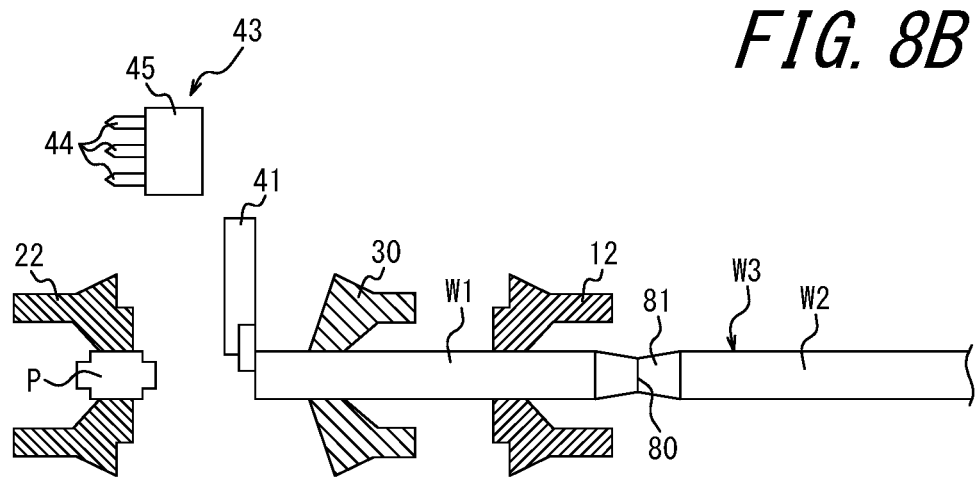
FIG. 8B is a schematic view illustrating a state in which a product is processed from a barstock formed by joining an old material and a new material.

When the calculation of the position of the joint 80 in the barstock W3 in the Z-axis direction has been completed, the end face of the barstock W3 is processed by the tool 41 and the front spindle 10 is moved in the Z-axis direction toward the rear spindle 20, with the end face retained by the tool 41 and the front chuck 12 opened. Then, as illustrated in FIG. 8A, the portion of the old material W1 in the barstock W3 is gripped by the front chuck 12. Then, as illustrated in FIGS. 8A and 8B, the front spindle 10 in this state is rotationally driven by the spindle motor to rotate the barstock W3, the selected tool 41 of the processing unit 40 is moved in the Y-axis direction (cutting direction) to cut into the barstock W3, and the front spindle 10 (front headstock 11) is moved in the Z-axis direction (feeding direction) to continuously carry out predetermined processing (cutting) and parting of the barstock W3, thereby processing a plurality of products P from the barstock W3.

Here, in the machine tool 1 of the present embodiment, as illustrated in FIG. 8A, in order to carry out a first processing with respect to the barstock W3 formed by joining the old material W1 and the new material W2 to thereby form the product P, the portion of the old material W1 in the barstock W3 is gripped by the front chuck 12. Thus, during the processing, the joint portion 80 having a poor strength is not positioned between the portion processed by the tool 41 and the portion gripped by the front chuck 12, so that the processing can be carried out with the portion of the old material W1 in the barstock W3 gripped by the front chuck 12. By this, the portion of the old material W1 in the barstock W3 can be processed with high accuracy.

Figure 9A:
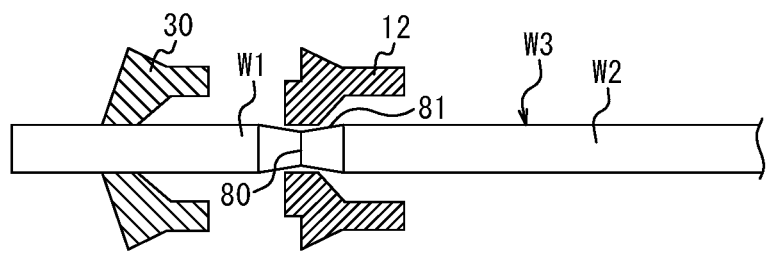
FIG. 9A is a schematic view illustrating a state in which the joint portion of the barstock formed by joining the old material and the new material is located on the front chuck.

On the other hand, when the barstock W3 formed by joining the old material W1 and the new material W2 is sequentially subjected to the predetermined processing and parting processing for forming the product P, as illustrated in FIG. 9A, it may happen that the axial position of the front chuck 12 and the axial position of the joint portion 80 of the barstock W coincide with each other. When the axial position of the front chuck 12 and the axial position of the joint portion 80 of the barstock W3 coincide with each other, there arises a risk that the front chuck 12 cannot reliably grip the barstock W3, thereby deteriorating the processing accuracy of the barstock W3. In particular, when burrs 90 are removed after joining the old material W1 and the new material W2 by friction-welding, there may be formed, on both sides of the joint portion 80 on the outer peripheral surface of the barstock W3, reduced diameter portions 81 having a diameter smaller than that of the outer peripheral surface of the barstock W3. Thus, when the joint portion 80 of the barstock W3 is gripped by the front chuck 12, there is a risk that a gap may be formed between the front chuck 12 and the joint portion 80 or the reduced diameter portion 81, causing the barstock W3 to rattle and thereby significantly deteriorating the processing accuracy of the barstock W3.

Figure 9B:
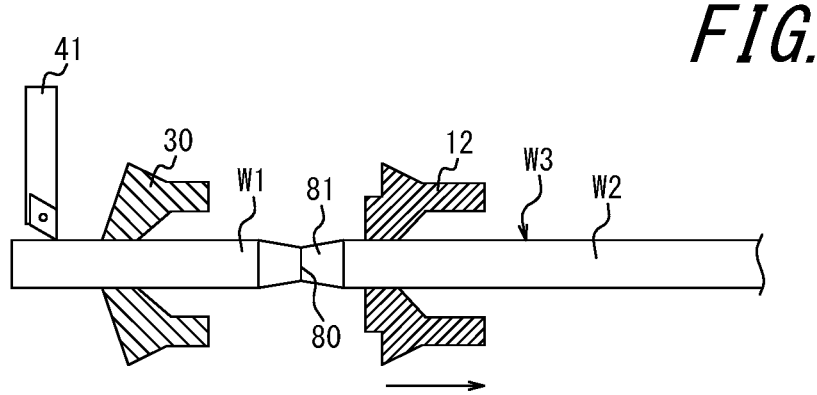
FIG. 9B is a schematic view illustrating a state in which the front spindle is axially moved to subject the barstock to a predetermined processing, with the portion of the barstock other than the joint portion gripped by the front chuck.
Figure 9C:
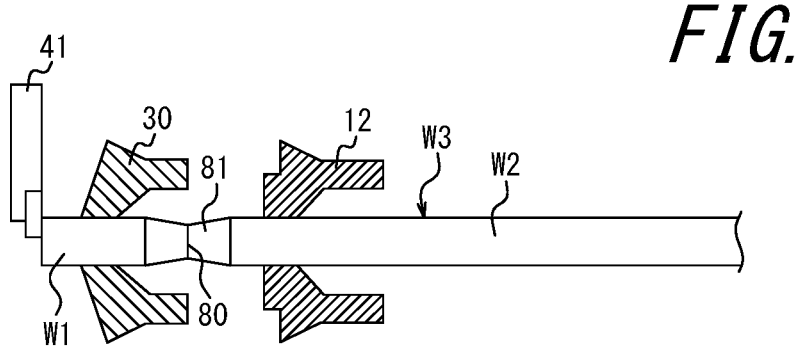
FIG. 9C is a schematic view illustrating a state in which the barstock formed by joining the old material and the new material is subjected to a parting process.

In contrast, according to the machine tool 1 of the present embodiment, when the predetermined processing and parting of the barstock W3 are sequentially carried out, if the axial position of the front chuck 12 and the axial position of the joint portion 80 of the barstock W3 comes into coincident with each other, the control unit 60 functions to carry out such a control wherein, after the front spindle 10 (front chuck 12) has been moved in the Z-axis direction relative to the barstock W3 or the tool 41, the portion of the new material W2 in the barstock W3 is gripped by the front chuck 12. As a result, as illustrated in FIGS. 9B and 9C, the predetermined processing and parting of the barstock W3 can be carried out with the portion of the barstock W3 other than the joint portion 80 between the old material W1 and the new material W2 gripped by the front chuck 12, that is, while the barstock W3 is securely gripped by the chuck 12. Therefore, the barstock W3 can be processed with high accuracy.

The control unit 60 can always accurately recognize the axial position of the joint portion 80 of the barstock W3 by the procedure using the measuring rod 61 described above. Based on the accurately recognized axial position of the joint portion 80 of the barstock W3, the movement of the front spindle 10 in the Z-axis direction can be accurately controlled by the control unit 60 so that the portion of the barstock W3 other than the joint portion 80 between the old material W1 and the new material W2 is gripped by the front chuck 12. By this, the barstock W3 can be more reliably held by the front chuck 12 and the barstock W3 can be processed more accurately.

Preferably, the control unit 60 is configured such that when burrs 90 are removed after joining of the old material W1 and the new material W2 by friction-welding, the front spindle 10 is moved in the Z-axis direction even if the axial positions of the front chuck 12 and the axial position of the reduced diameter portion 81 of the barstock W3 coincide with each other. By this, ensuring that the front chuck 12 neither grips the joint portion 80 of the barstock W3 nor the reduced diameter portion 81, the barstock W3 can be processed more reliably and accurately.

In the present embodiment, when the axial position of the front chuck 12 and the axial position of the joint portion 80 of the barstock W coincide with each other, the front spindle 10 (front chuck 12) is moved in a direction away from the rear spindle 20, thereby causing the front chuck 12 to grip the portion of the new material W2 in the barstock W3. In this case, the front chuck 12 may be moved in the Z-axis direction by a desired distance, by reducing restrictions on the movement space for the front spindle 10 or the front chuck 12.

On the other hand, if the axial position of the front chuck 12 and the axial position of the joint portion 80 of the barstock W coincide with each other, the portion of the old material W1 in the barstock W3 may be gripped by the front chuck is used, after the front spindle 10 (front chuck 12) has been moved toward the rear spindle 20. In this case, the position closer to the processed portion of the barstock W3 can be held by the front chuck 12. By this, the barstock W3 can be more reliably held by the front chuck 12 and the barstock W3 can be processed more accurately.

Figure 10A:
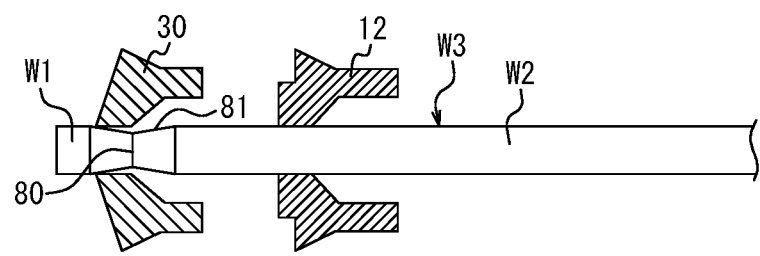
FIG. 10A is a schematic view illustrating a state in which the joint portion of the barstock formed by joining the old material and the new material is located on the guide bush.
Figure 10B:
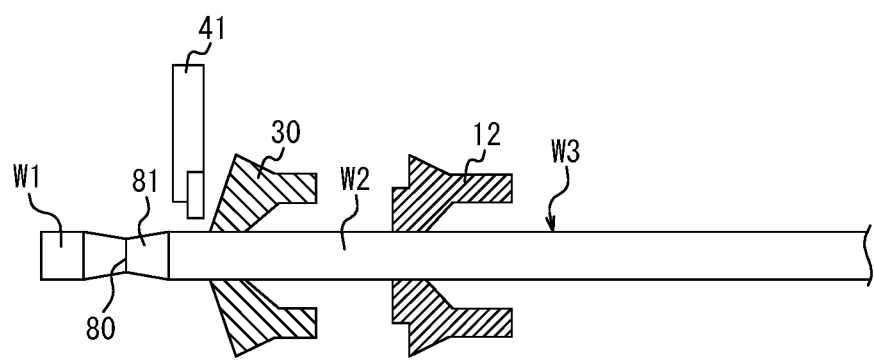
FIG. 10B is a schematic view illustrating a state in which the barstock is subjected to the parting process on the side closer to the new material than the joint portion.

Preferably, when the machine tool 1 includes the guide bush 30 and the predetermined processing and parting of the barstock W3 are sequentially carried out, the control unit 60 may be configured such that, if the axial position of the joint portion 80 of the barstock W is located on the guide bush 30, as illustrated in FIG. 10A, the parting of the barstock W3 is carried out on the side of the new material W2 rather than the portion 80, after the predetermined processing on the barstock W3 has been completed, as illustrated in FIG. 10B. This makes it possible to prevent the portion of the barstock W3 having the joint portion 80 from being processed as the product P.

In this instance, the control unit 60 may also be configured to set in advance the number of processing of the product P, from the portion of the old material W1 in the barstock W, based on the axial position of the joint portion 80 so that the joint portion 80 is not supported by the guide bush 30.

Also in this case, when the reduced diameter portion 81 of the barstock W is located on the guide bush 30, parting of the barstock W3 is controlled as being carried out on the side closer to the new member W2 than the joint portion 80, after the predetermined processing on the barstock W3 has been completed. This makes it possible to prevent the portion of the barstock W3 having the reduced diameter portion 81 from being processed as the product P.

The method for the control unit 60 to recognize the position of the joint portion 80 in the Z-axis direction is not limited to the method using the measuring rod 61 described above, and various methods or configurations may be adopted.

For example, as illustrated in FIG. 11A, the configuration may be such that, after the old material W1 has been transferred to the rear spindle 20 and before the friction joining, as illustrated in FIG. 11A, the protrusion amount of the old material W1 from the rear chuck 22 is measured by the rear side positioning plate 72 and the protrusion amount of the new material W2 from the front chuck 12 is measured by the front side positioning plate 73, and the end face of the old material W1 and the end face of the new material W2 are subjected to processing as necessary, as illustrated in FIG. 11B, before the end face of the old material W1 and the end face of the new material W2 are brought into contact with each other and the position of the rear end face of the old material W1 is measured by a position measurement terminal 62 on the side of the old material, as illustrated in FIG. 11C. Then, the position of the joint portion 80 may be calculated based on the positions of the front chuck 12 and the back chuck 22 in the Z-axis direction, the protrusion amount of the old material W1 from the rear chuck 22, the protrusion amount of the new material W2 from the front chuck 12, and the position of the rear end surface of the old material W1 as measured by the old material position measurement terminal 62.

Further, the method for causing the control unit 60 to recognize the position of the joint portion 80 in the Z-axis direction is not limited to what has been described above. Various methods may be adapted including, for example: a method wherein the barstock W3 formed by joining the old material W1 and the new material W2 captured by a camera, and the captured image is subjected to image recognition processing for detecting the position of the joint portion 80 in the Z-axis direction; a method using an optical position detection sensor for detecting the position of the joint portion 80 in the Z-axis direction; a method wherein the position of the joint 80 in the Z-axis direction is detected based on the processing program of the control unit 60; and a method wherein the position of the joint 80 in the Z-axis direction is calculated based on the processing length of the barstock W.

Figure 12A:
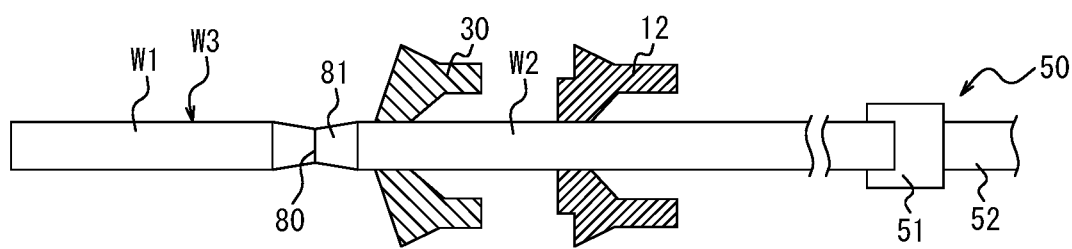
FIGS. 12A and 12B are schematic views illustrating the procedure for pulling a barstock formed by friction-welding an old material and a new material to the side of the front spindle by a barstock supply unit.

In the above embodiment, after joining the old material W1 and the new material W2 into a single barstock W3, as illustrated in FIG. 7A, with the front chuck 12 holding the barstock W3 while releasing the rear chuck 22 from gripping of the barstock W3, the front spindle 10 is moved in the Z-axis direction away from the rear spindle 20 to pull the barstock W3 out of the rear spindle 20. However, as described above, the barstock supply unit 50 has a function of pulling the barstock W, which protrudes from the front spindle 10 toward the rear spindle 20, toward the front spindle 10. Thus, by using this function, the configuration may be such that, after joining the old material W1 and the new material W2 into one rod W3, as illustrated in FIG. 12A, without causing front spindle 10 to be moved in the Z-axis direction, the barstock W3 is moved by the barstock supply unit 50 toward the front spindle 10 by the length of the old material W1, thereby pulling the barstock W3 out of the rear spindle 20. In this case, the control unit 60 as the pull-in means controls the operation of the front spindle 10, the rear spindle 20 and the barstock supply unit 50 so as to remove the portion of the old material W1 in the barstock W3 from the rear spindle 20 and pulls it toward the front spindle 10.

Figure 12B:
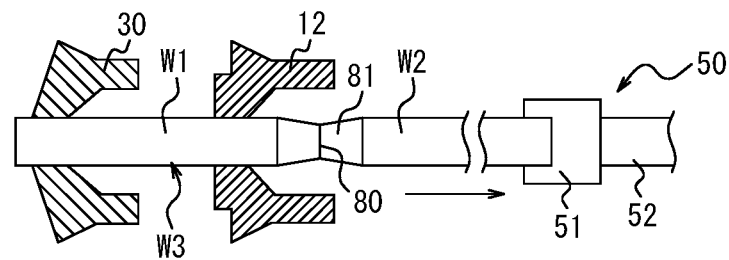

More specifically, as illustrated in FIG. 12A, when the old material W1 and the new material W2 are joined to form a barstock W3, the gripping of the barstock W3 by the front chuck 12 and the gripping of the barstock W3 by the rear chuck 22 are released while the rear end of the barstock W3 is gripped by the finger 51 of the barstock supply unit 50. In this state, as illustrated in FIG. 12B, the finger 51 is driven by the drive rod 52 and moved in the Z-axis direction by the length of the old material W1 backwards away from the rear spindle 20. By this, the barstock W3 can be pulled toward the front spindle 10 by means of the barstock supply unit 50 and removed from the rear spindle 20.

As described above, according to the configurations illustrated in FIGS. 12A and 12B, even in the case of a machine tool including a front spindle 10 in the form of a fixed spindle that cannot be moved in the Z-axis direction, the barstock W3 formed by joining the old material W1 and the new material W2 can be pulled out from the rear spindle 20.

After the barstock W3 has been pulled from the rear spindle 20, in the same manner as illustrated in FIGS. 8A and 8B, the front spindle 10 is rotationally driven by the spindle motor to rotate the barstock W3, the selected tool 41 of the processing unit 40 is moved in the Y-axis direction (cutting direction) to cut into the barstock W3, and the front spindle 10 (front headstock 11) is moved in the Z-axis direction (feeding direction) to sequentially carry out the predetermined processing (cutting) and parting of the barstock W3, thereby processing a plurality of products P from the barstock W3.

In the configuration illustrated in FIG. 12, furthermore, since the barstock W3 is moved by the length of the old material W1 by means of the barstock supply unit 50, the barstock W3 after the movement can be set in a state protruding from the front spindle 10 by a predetermined amount suitable for processing by means of the processing unit 40 or the like. By this, immediately after the movement, the barstock W3 removed from the rear spindle 20 and gripped by the front chuck 12 of the front spindle 10 can be subjected to the predetermined processing and parting by means of the processing unit 40, to thereby form the product P.

In the above embodiment, it is the back chuck 22 of the rear spindle 20, which is used to grip the old material W1. However, it is also possible to provide a workpiece clamp device 24 having an axis parallel to the axis of the rear spindle 20 and installed on the rear spindle 20 is used.

Figure 13A:
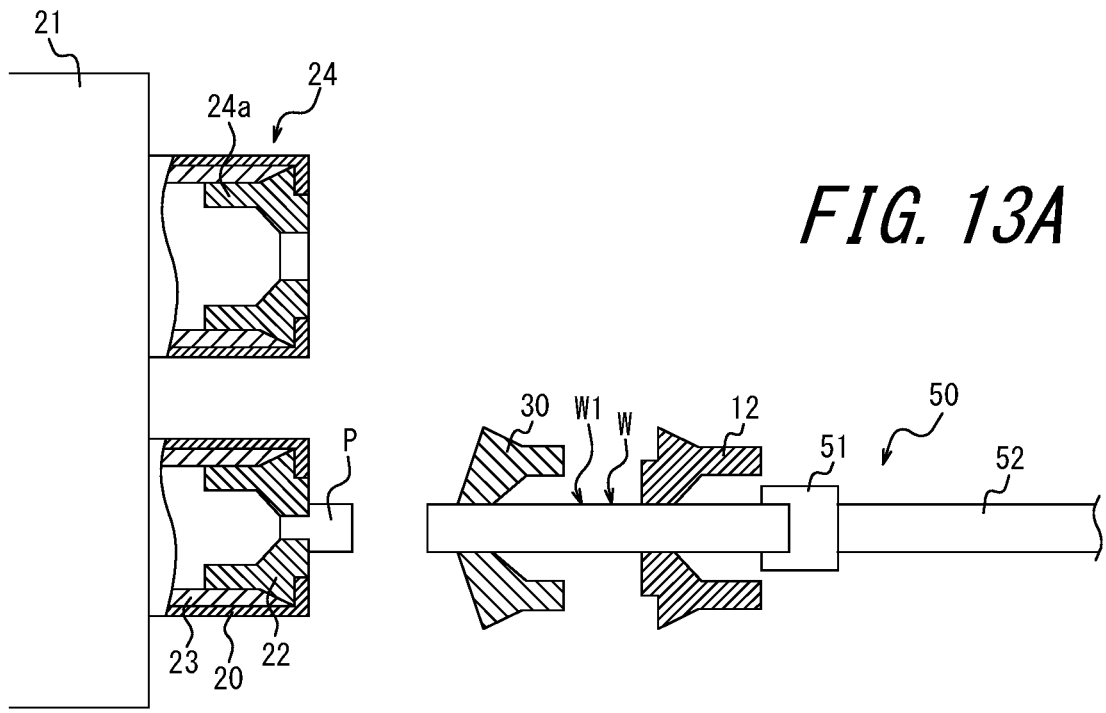
FIGS. 13A and 13B are schematic views illustrating the procedure in a machine tool provided with a workpiece clamp device, for gripping and pulling out the old material by the workpiece clamp device while gripping the final product with the back chuck.

More specifically, as illustrated in FIG. 13A, the workpiece clamp device 24 may be provided on the rear headstock 21 of the rear spindle 20, in parallel with the rear spindle 20, to have an axis that is in parallel with the axis of the rear spindle 20. The workpiece clamp device 24 includes a clamp chuck (clamp side gripping means) 24a having the same configuration as the rear chuck 22. The clamp chuck 24a is the same in the inner diameter as the front chuck 12, and thus the clamp chuck 24a of the workpiece clamp device 24 is adapted to grip the old material W1 that has been removed from the front spindle 10.

In contrast, the rear chuck 22 is smaller in the inner diameter than the front chuck 12, and is thus adapted to grip the workpiece (the product P) that had been gripped by the front chuck 12 and subjected to the predetermined processing by the processing unit 40 on the front spindle 10 such that the outer diameter of the tip facing the rear spindle 20 is smaller than the outer diameter of the barstock W.

When the work clamp device 24 is provided on the rear headstock 21 in addition to the rear spindle 20, the configuration may be such that the old material W1 is gripped by the workpiece clamp device 24 while the new material W2 is gripped by the front chuck 12 of the front spindle 10, in order to bring the end faces of the rods into contact with each other for carrying out the friction-welding and thereby forming the barstock W3.

Figure 13B:
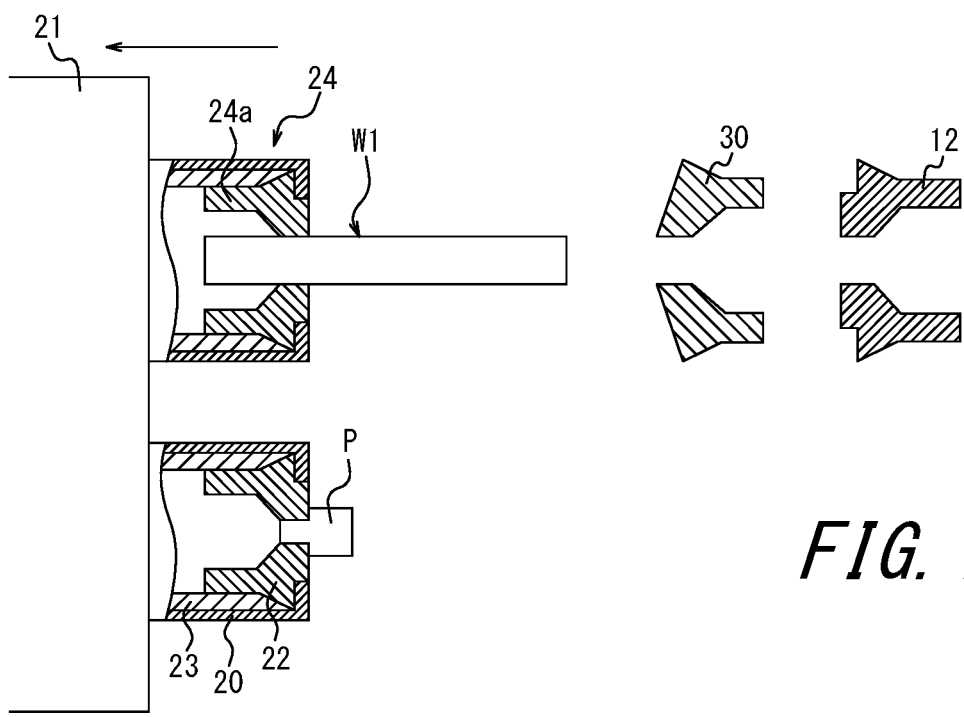
Figure 14A:
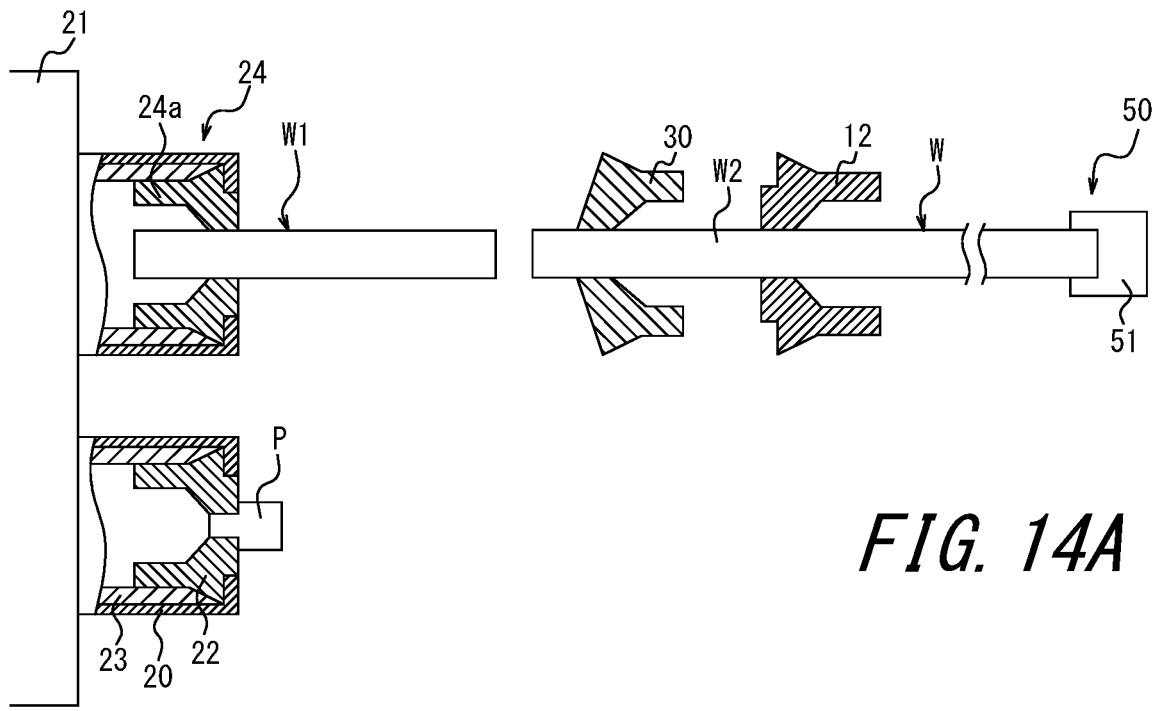
FIGS. 14A and 14B are schematic views illustrating the procedure in a machine tool provided with a workpiece clamp device, for simultaneously carrying out a predetermined processing on a barstock and joining the old material and the new material.

That is, as illustrated in FIG. 13A, the final workpiece (the product P) processed by the front spindle 10 and subjected to parting from the barstock W is gripped by the back chuck 22 of the rear spindle 20. Next, as illustrated in FIG. 13B, the gripping of the old material W1 by the front chuck 12 is released, and the old material W1 is now gripped by the clamp chuck 24a of the workpiece clamp device 24. In that state, by moving the rear headstock 21 away from the front spindle 10 in the Z-axis direction, the old material W1 is removed from the front spindle 10. Next, as illustrated in FIG. 14A, a new material W is supplied as the new barstock W2 from the barstock supply unit 50 to the front spindle 10, and the new bar W2 is gripped by the front chuck 12. Then, in the same procedure as in the cases illustrated in FIGS. 5 and 6, the opposite end faces of the old material W1 and the new material W2 are brought into contact with each other, to carry out the friction-welding of the old material W1 and the new material W2. By this, as illustrated in FIG. 14B, a single barstock W3 can be formed from the old material W1 and the new material W2, in which the opposite axial end faces are joined as the joint surface.

Figure 14B:
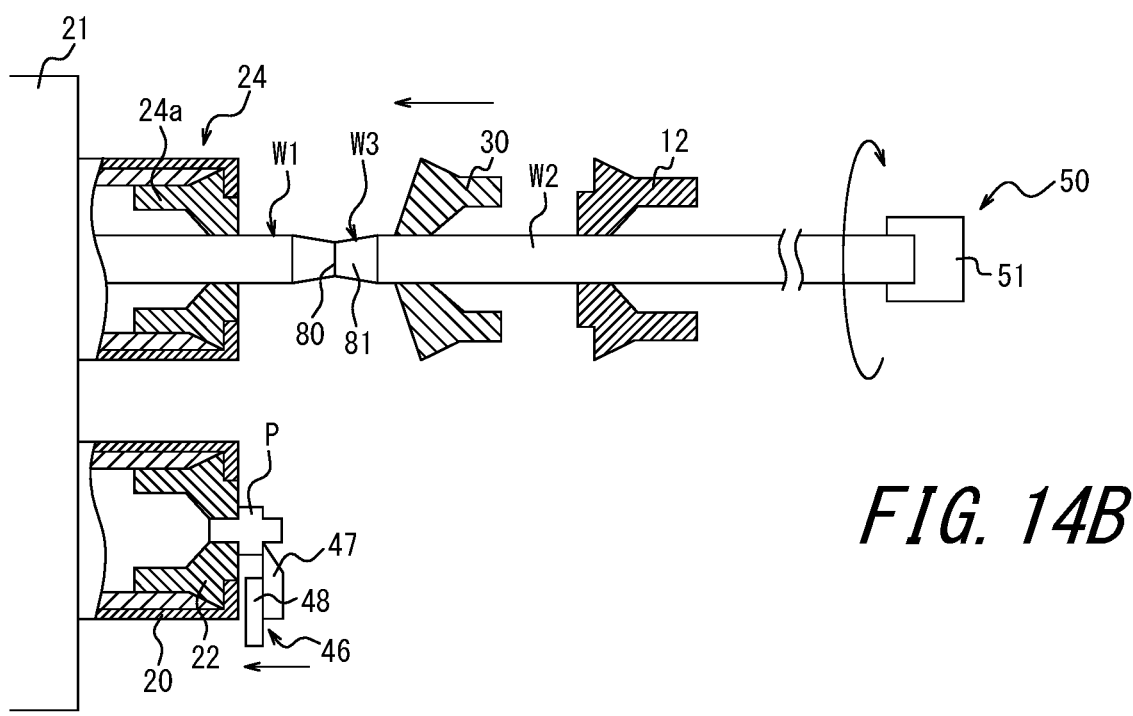

In this instance, since the rear spindle 20 and the work clamp device 24 are provided on the rear spindle 21, as illustrated in FIG. 14B, it is possible to simultaneously carry out the friction-welding between the old material W1 and the new material W2, and the predetermined processing by the tool 47 of the rear movable processing unit 46, with respect to the final workpiece (the product P) gripped by the rear chuck 22 of the spindle 20. This makes it possible to shorten the time required to for completing the friction-welding between the old material W1 and the new material W2.

Further, in the configuration where the work clamp device 24 is provided on the rear spindle 21 in addition to the rear spindle 20, since the old material W1 is gripped by the clamp chuck 24a of the work clamp device 24 provided on the rear spindle 21, the back chuck 22 of the rear spindle 20 can be made smaller in the inner diameter than the front chuck 12 of the front spindle 10 according to the workpiece (the product P) processed by the front spindle 10. This makes it possible to adapt the machine tool 1 to the manufacture of products P of various shapes.

Figure 15A:
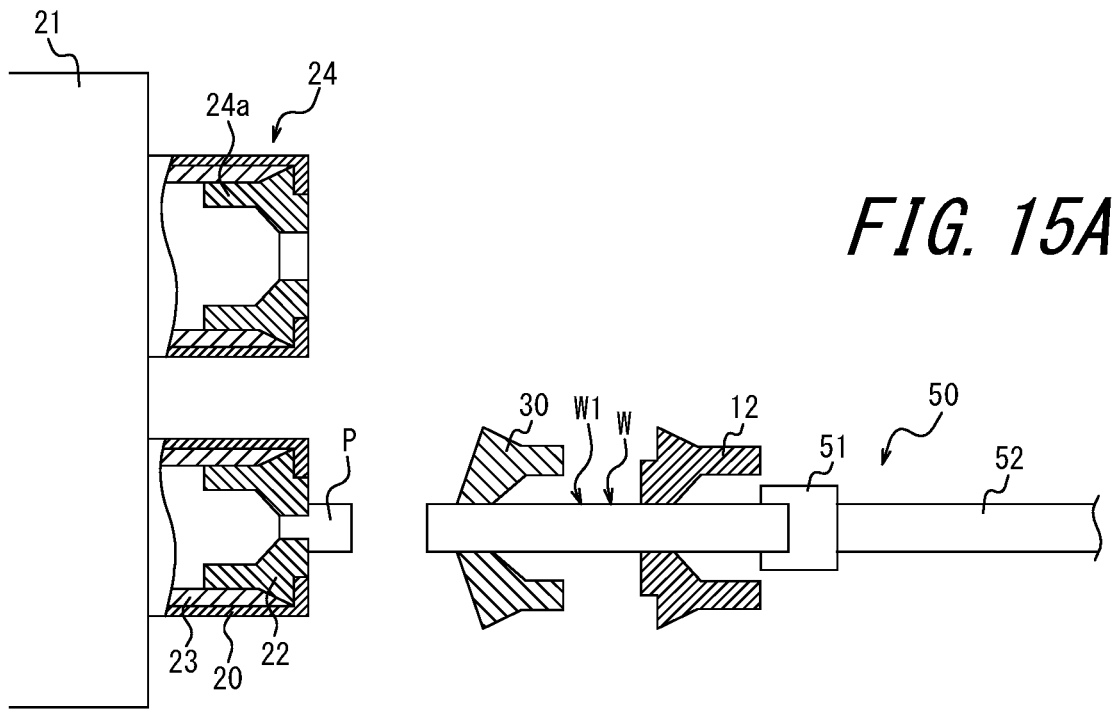
FIGS. 15A and 15B are schematic views illustrating the procedure in a machine tool provided with a workpiece clamp device, for carrying out a predetermined processing on a final product gripped by a rear chuck while gripping an old material with the workpiece clamp device and pulling it out from the front spindle.
Figure 15B:
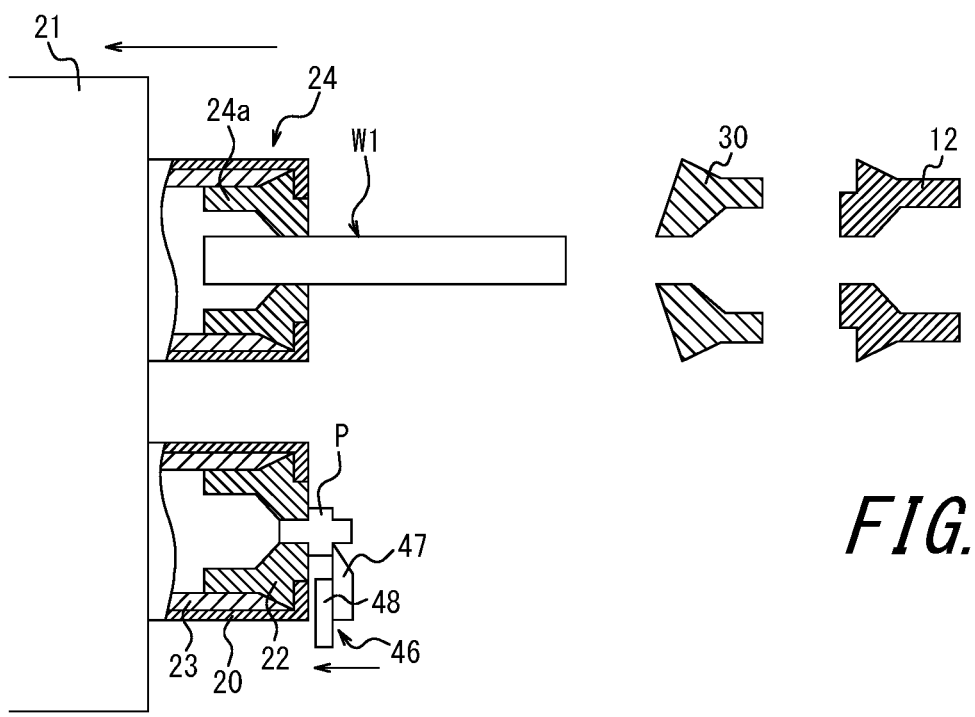

Further, when the workpiece clamp device 24 is provided on the rear spindle 21 in addition to the rear spindle 20, it is possible to carry out the processing by means of the tool 47 of the rear movable processing unit 46 with respect to the final workpiece (the product P) gripped by the rear chuck 22 of the rear spindle 20 continuously, after the final workpiece (the product P) obtained by processing the bar W3 on the front spindle 10 has been transferred from the front spindle 10 to the rear spindle 20, as illustrated in FIG. 15A. That is, as illustrated in FIG. 15A, after the final workpiece (the product P) has been transferred from the front spindle 10 to the rear spindle 20, the predetermined processing by means of the tool 47 of the rear movable processing unit portion 46 with respect to the final work (product P) is started. Furthermore, even while the old material W1 is gripped by the clamp chuck 24a of the workpiece clamp device 24 and removed from the front spindle 10, as illustrated in FIG. 15B, the tool 47 is made to follow the final workpiece (the product P) moving together with the rear spindle 20 or the rear headstock 21, to thereby carry out the predetermined processing continuously. This makes it possible to shorten the time required for completing the removal of the old material W1 from the front spindle 10.

In this way, when the rear spindle 21 is provided with the work clamp device 24 in addition to the rear spindle 20, even while the old material W1 is being gripped by the rear spindle 20, it is possible to carry out the predetermined processing, by means of the tool 47 of the rear movable processing unit 46, with respect to the final product P in the form of the barstock.

Further, when the workpiece clamp device 24 is provided on the rear headstock 21 in addition to the rear spindle 20, the front chuck 12 and the workpiece clamp device 24 may be the same in the inner diameter, while matching the inner diameter of the rear chuck 22 of the rear spindle 20 with the workpiece (the product P) processed on the front spindle 10. In this instance, it is possible to carry out the friction-welding of the old material W1 and the new material W2 at a location between the workpiece clamp device 24 and the front chuck 12m after the final workpiece (the product P) has been transferred from the front spindle 10 to the rear spindle 20 and then delivered out.

Obviously, the present disclosure is not limited to the embodiment described above and various modifications may be made without departing from the scope thereof.

For example, in the embodiment described above, the old material W1 and the new material W2 are joined by friction-welding, though the present disclosure is not limited to this, and the manner of joining may be variously modified. Thus, for example, the old material W1 and the new material W2 may be joined to each other by forming a recess at one end of either the old material W1 or the new material W2 while providing a protrusion on the other of the old material W1 and the new material W2, and fitting them together.

In the embodiment described above, the machine tool 1 is provided with the guide bush 30, though the machine tool 1 may be of a configuration without the guide bush 30.

REFERENCE SIGNS LIST

1 Machine tool
2 Base
3 Front moving mechanism
4 Rear moving mechanism
10 Front spindle (first spindle)
11 Front headstock
12 Front chuck (first gripping means)
13 Chuck sleeve
20 Rear spindle (second spindle)
21 Rear headstock
22 Rear chuck (second gripping means)
23 Chuck sleeve
24 Workpiece clamp device
24a Clamp chuck (clamping side gripping means)
30 Guide bush
31 Guide bush support base
40 Processing unit (processing means)
41 Tool
42 Tool post
43 Rear fixed processing unit (processing means)
44 Tool
45 Rear tool post
46 Rear movable processing unit (processing means)
47 Tool
48 Tool post
50 Barstock supply unit
51 Finger
52 Drive rod
60 Control unit
61 Measuring rod (position recognition means)

62 Old material position measurement terminal (position recognition means)
70 Recess
71 Recess
72 Rear positioning plate
73 Front positioning plate
80 Joint portion
81 Reduced diameter portion
90 Burrs
W Barstock
W1 Old material
W2 New material
W3 Barstock
P Product
A Protrusion length
B Protrusion length
α Crushing length
L Length

The invention claimed is:

1. A machine tool comprising:
a first spindle including a first gripping means;
a barstock supplier for supplying a barstock to the first spindle so that the barstock is gripped by the first gripping means;
a second spindle provided on a rear headstock so that an axis of the first spindle and an axis of the second spindle are parallel to each other, the second spindle including a second gripping means configured to grip the barstock gripped by the first gripping means;
a tool configured to part off the barstock gripped by both the first gripping means and the second gripping means into a second material gripped by the first gripping means and a workpiece gripped by the second gripping means and perform a predetermined processing to the workpiece gripped by the second gripping means;
a workpiece clamp provided on the rear headstock and adapted to grip the second material removed from the first spindle; and
a control unit configured to control the first spindle, the barstock supplier, the second spindle, the tool, the workpiece clamp, and the rear headstock, wherein
the control unit is further configured to control the first spindle, the barstock supplier, and the workpiece clamp to join an end portion of the second material gripped by the workpiece clamp and an end portion of a first material which is another barstock newly supplied by the barstock supplier to the first spindle and gripped by the first gripping means, thereby to integrate the second material and the first material into a single barstock; and
the control unit is further configured to control the first spindle, the second spindle, the tool, and the workpiece clamp to join the second material gripped by the workpiece clamp and the first material gripped by the first gripping means simultaneously with the tool performing the predetermined processing to the workpiece gripped by the second gripping means.

2. The machine tool according to claim 1, wherein the workpiece clamp has a clamp-side gripping means for gripping the second material, and the clamp-side gripping means and the first gripping means have a same inner diameter.

* * * * *